G. W. TURNER.
PLOW POINT BOLT.
APPLICATION FILED FEB. 4, 1913.
1,088,046.
Patented Feb. 24, 1914.
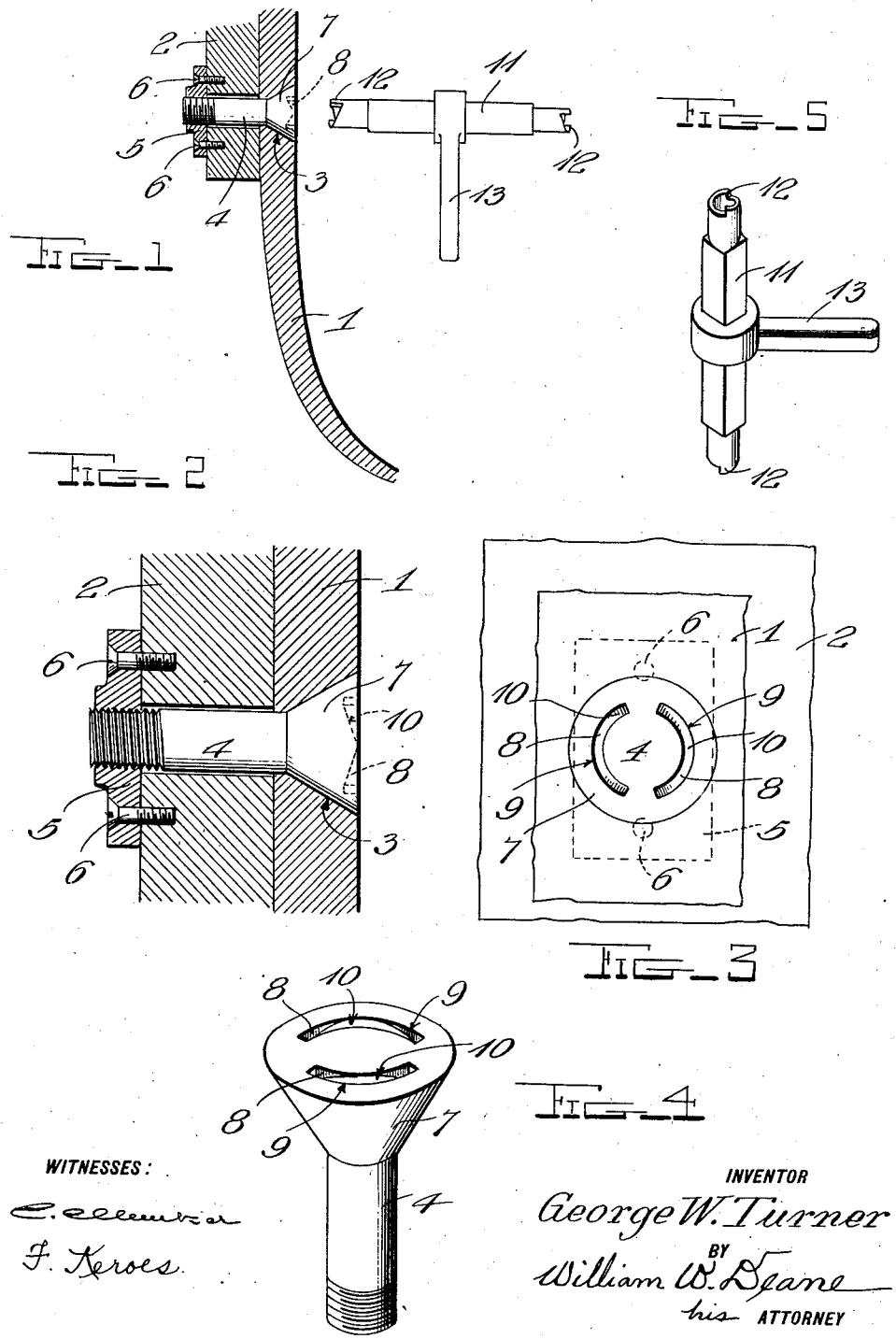
WITNESSES:
INVENTOR
George W. Turner
BY
William W. Deane
his ATTORNEY

UNITED STATES PATENT OFFICE.

GEORGE W. TURNER, OF BISHOP, CALIFORNIA.

PLOW-POINT BOLT.

1,088,046.  Specification of Letters Patent.  Patented Feb. 24, 1914.

Application filed February 4, 1913. Serial No. 746,171.

*To all whom it may concern:*

Be it known that I, GEORGE W. TURNER, a citizen of the United States, residing at Bishop, in the county of Inyo and State of California, have invented certain new and useful Improvements in Plow-Point Bolts, of which the following is a specification.

This invention has relation to bolts especially adapted to be used for securing plow points in place upon plow standards or frogs, although it may be used to advantage for securing other objects together.

An object of the invention is to so construct the bolt that when it is in position in a plow point the outer surface of its head is flush with the forward surface of the point and the head which is conical is snugly received in the conical opening provided in the point.

A further object of the invention is to provide in conjunction with a bolt having a head as specified a series of recesses in the head to which a wrench may be readily applied. The said recesses being so disposed as not to weaken the head and the opening in the point being adapted to prevent the head from splitting or fracturing during the operation of tightening or loosening the bolt. In view of the objects sought to be attained as hereinbefore set forth the disposition of the recesses in the head with relation to the configuration of the head and the opening in the point or object secured by the bolt is a matter of vital importance in so far as the idea of the invention is concerned.

With these and other objects in view, the invention consists in certain novel features of construction as hereinafter shown and described, and then particularly pointed out in the claim and in the drawings illustrative of the preferred embodiment of the invention.

Figure 1 is a sectional view of a plow point with the bolt applied. Fig. 2 is an enlarged similar view. Fig. 3 is an end view of the bolt. Fig. 4 is a perspective view of the same. Fig. 5 is a perspective view of the head and handle adapted to be used with the bolt.

Corresponding and like parts are referred to in the following description and indicated in all the views of the accompanying drawings by the same reference characters.

As illustrated in the accompanying drawing the bolt is shown securing a point 1 to a standard or frog 2. The said point and standard are of any desired pattern or form. The point 1 is provided with a conical bolt opening 3. The bolt 4 passes through the opening 3 and a registering opening provided in the standard or frog 2. A nut 5 is fixed to the rear side of the standard or frog 2 and is screw threaded upon the rear end of the bolt 4 in the usual manner.

The bolt 4 is provided with a conical head 7 which is adapted to fit snugly in the bolt opening 3. When the head 7 is snugly received in the opening 3 the outer surface of the head is flush with the forward surface of the point 1 and consequently the conical wall of the opening 3 is in close contact with the conical side of the head 7 and serves to prevent the head from splitting or cracking when the wrench is applied to the head for tightening or loosening the bolt.

The head 7 is provided at its forward side or end with arcuate recesses 8. These recesses are arranged in pairs and the members of the pairs are located at the opposite sides of the center of the head 7. The side walls 9 of the recesses 8 are parallel with the axis of the bolt 4 and are surrounded by the conical exterior of the head 7. The bottoms 10 of the recesses 8 incline downwardly or inwardly from the outer surface of the head 7 to the ends of the recesses 8. Two sets of recesses 8 each including two members are provided. The members of one pair of recesses 8 have their shallow ends adjacent the shallow ends of the members of the other set of recesses. Consequently the deep ends of the recesses 8 which are adjacent each other are spaced from each other while the shallow ends of the said recesses approximately meet each other.

In combination with a bolt as described a wrench head indicated at 11 is used. This head is provided at its ends with teeth 12 which are adapted to be inserted in the recesses 8. The teeth 12 at one end of the head 11 are disposed in the opposite direction from the teeth 12 at the other end of the said head. One set of teeth 12 is inserted in one pair of recesses 8 for tightening the bolt 4 and the other set of teeth 12 is inserted in the other set of recesses 8 for loosening the bolt 4. The head 11 may be of any desired pattern or configuration and the handle lever 13 may be applied thereto for the purpose of turning the same.

From the above description it will be see that during the turning operation of the bolt 4 the head is at all times snugly received in the opening 3 of the point 1 and as strain is applied to the bolt through the wrench head 11, the wall of the opening 3 braces the head 7 of the bolt and prevents the said head 7 from splitting or fracturing. This same advantage is gained when the bolt 4 is being loosened. Furthermore the recesses 8 are entirely within the conical wall of the head 7 and consequently there are no projections or obstructions in advance of the forward surface of the point 1. For this reason the bolt is especially adapted to be used for securing plow points and it may be used to advantage upon heavy gang plows for readily detaching the points without having to detach the standard or frog from the plow and turning the same over to get at the nut. This will save considerable time and labor as these plow bottoms are large, cumbersome and heavy.

Having described the invention, what is claimed, is:—

A bolt provided at the end of its head with arcuate recesses, said recesses being concentrically positioned with relation to the axis of the bolt and being in arcuate alinement longitudinally and having parallel side walls, said recesses being arranged in two sets, each set including two members, the members of each set being located diametrically at opposite sides of the axis of the bolt, the recesses being deeper at one end than at the other, the deep ends of the recesses of the different sets being adjacent each other and the shallow ends of the recesses of the different sets substantially merging into each other, and the deep ends of the members of the same set of recesses being diametrically opposite each other with relation to the center of the bolt.

In testimony whereof I affix my signature in presence of two witnesses.

GEORGE W. TURNER.

Witnesses:
 WM. B. HIMROD,
 JAS. WATTERSON.